United States Patent [19]
Yamamoto

[11] Patent Number: 6,119,549
[45] Date of Patent: Sep. 19, 2000

[54] FLYWHEEL ASSEMBLY AND A TORQUE CONVERTER

[75] Inventor: Kozo Yamamoto, Daito, Japan

[73] Assignee: Exedy Corporation, Osaka, Japan

[21] Appl. No.: 09/109,371

[22] Filed: Jul. 2, 1998

[30] Foreign Application Priority Data

Jul. 8, 1997 [JP] Japan .................................. 9-182185

[51] Int. Cl.$^7$ .................................................. F16F 15/10
[52] U.S. Cl. ............................ 74/574; 74/572; 74/573 R; 29/894; 464/68
[58] Field of Search ............................ 74/572–574, 595; 192/70.16, 70.13, DIG. 1; 403/260, 359; D15/148; 464/68; 29/445, 894, 893.2

[56] References Cited

U.S. PATENT DOCUMENTS

| | | | |
|---|---|---|---|
| D. 402,995 | 12/1998 | Hakamata | D15/148 |
| 4,791,829 | 12/1988 | Fukushima et al. | 74/574 |
| 4,871,342 | 10/1989 | Boss et al. | 464/98 |
| 5,097,721 | 3/1992 | Umeyama | 74/572 X |
| 5,191,810 | 3/1993 | Craft et al. | 192/70.13 X |
| 5,216,798 | 6/1993 | Sterling | 29/893.2 X |
| 5,226,756 | 7/1993 | Takahashi et al. | 29/894 |
| 5,323,665 | 6/1994 | Rediker | 464/68 X |
| 5,465,635 | 11/1995 | Kono et al. | 74/595 |
| 5,515,745 | 5/1996 | Tsuruta et al. | 74/572 |
| 5,617,940 | 4/1997 | Fukushima et al. | 192/70.17 |
| 5,799,766 | 9/1998 | Link et al. | 192/70.16 |
| 5,836,217 | 11/1998 | Sudau et al. | 74/573 R X |
| 5,979,594 | 11/1999 | Doman | 74/572 X |

FOREIGN PATENT DOCUMENTS

| | | | |
|---|---|---|---|
| 3222119 | 10/1983 | Germany | 74/573 R |
| 58-151734 | 10/1983 | Japan | 74/573 R |
| 64-11453 | 1/1989 | Japan | 74/573 R |

*Primary Examiner*—Vinh T. Luong
*Attorney, Agent, or Firm*—Shinjyu Global IP Counselors, LLP

[57] ABSTRACT

A flywheel assembly 1 includes a flywheel 2, a flexible plate 3 and a dynamic damper 4 to reduce the noise of an engine during acceleration of the speed of the engine. The flexible plate 3 connects the flywheel 2 with a crankshaft 5 so as to be able to oscillate in a bending direction. The dynamic damper 4 includes a mass body 13, and a plate 14 which connects the mass body 13 with the flywheel 2 so as to be able to oscillate in a bending direction.

13 Claims, 5 Drawing Sheets

FLYWHEEL ASSEMBLY AND A TORQUE CONVERTER

BACKGROUND OF THE INVENTION

1. Field of the Invention

This invention generally relates to a rotary portion, which has a flexible plate to be flexible in a bending direction. More specifically, the present invention relates to flywheel assemblies and torque converters in which a dynamic damper is coupled thereto to absorb vibrations.

2. Background Information

A flywheel is usually installed in an engine of a car to prevent rotary fluctuations at the low speed range of the engine. In the flywheel, a clutch device and a ring gear are usually installed. The engine generates a driving power by converting the combustion force generated by combustion of the fuel into a torque that rotates a crankshaft. At that time, a bending force is exerted on the crankshaft when the engine converts the combustion force into a torque that rotates a crankshaft. The crankshaft is then bent by the combustion, resulting in a bending vibration on the flywheel in a bending direction. The reaction force from the vibration of the flywheel is transmitted to the engine block, which further vibrates the body of the car via the engine mount. This results in a considerable amount of noise during acceleration of the engine.

In order to reduce noise during acceleration of the speed of the engine, the flywheel is connected to the crankshaft by a flexible plate. The flexible plate is usually a thin disk-shaped member or a thin cross-shaped member, which has a high rigidity in the direction of rotation and a low rigidity in the direction of the bending vibrations. When bending vibrations are transmitted, the flexible plate absorbs the vibrations by bending in the bending direction (generally axially), resulting in a reduction of vibrations on the flywheel.

Figure 5:
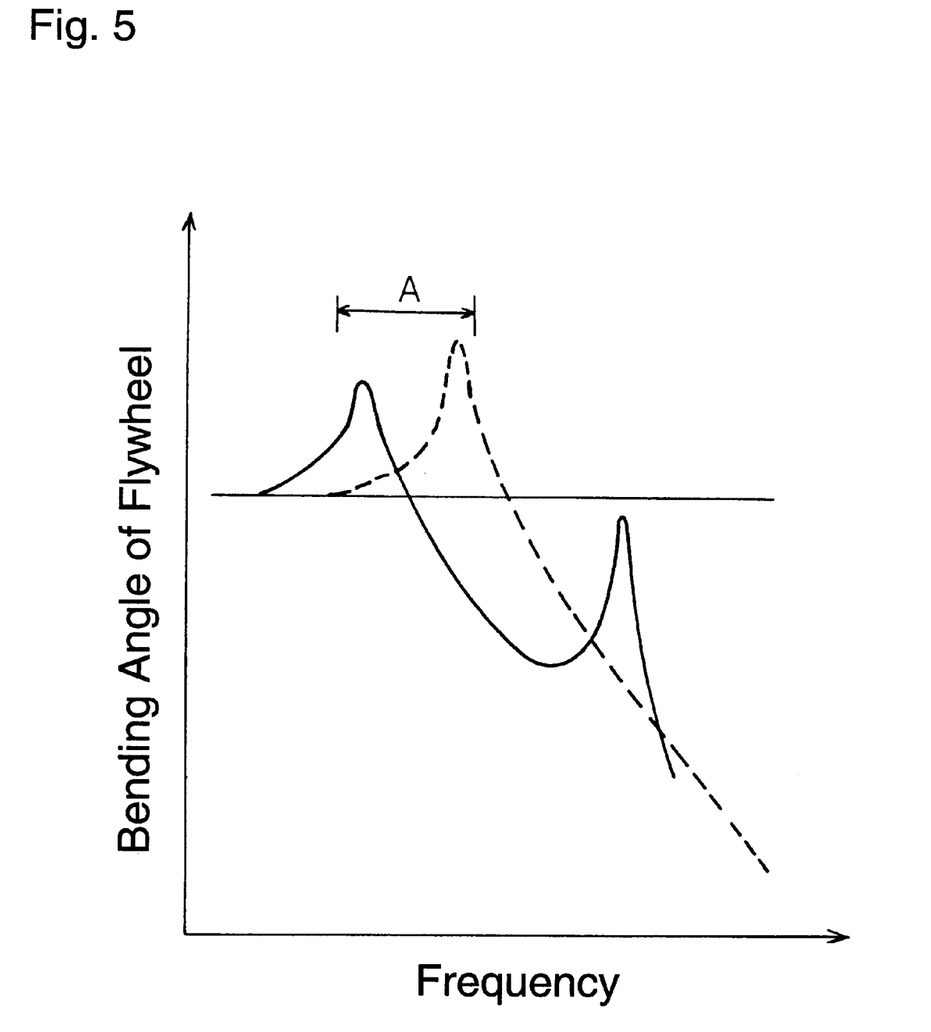
FIG. 5 is a graph illustrating vibrational characteristics of a conventional flywheel without the present invention incorporated therein.

As shown in FIG. 5, a vibrational characteristic of a conventional flywheel is illustrated. The dotted line of FIG. 5 represents a characteristic of a flywheel assembly in which the flywheel is fixed directly to the crankshaft without a flexible plate. The solid line of FIG. 5 represents a characteristic of a flywheel assembly which has a flexible plate coupled between the flywheel and the crankshaft.

In the characteristic of the dotted line (without a flexible plate) shown in FIG. 5, the resonance frequency exists within a normal range A. In the characteristic of the solid line (with a flexible plate) shown in FIG. 5, the resonance frequency is divided into two sections. Both sections of resonance frequencies have a vibration level (bending angle of a flywheel) which is lower than the resonance frequency of the characteristic of the dotted line (without flexible plate). In addition, the two sections of resonance frequencies are shifted into high and low frequency sides from a normal range A, respectively. Thus, by shifting the resonance frequencies from the normal range A, noise can be reduced during acceleration of the speed of the engine.

However, in the characteristic of the solid line (with flexible plate) of FIG. 5, the resonance frequency on the low frequency side sometimes remains in a normal range A. In that case, nevertheless, the noise is caused during acceleration of the speed of the engine. An object of the present invention is to reduce a noise in accelerating the speed.

In view of the above, there exists a need for flywheel assemblies and torque converters with dynamic dampers which overcome the problems in the prior art devices. This invention addresses these needs in the prior art as well as other needs, which will become apparent to those skilled in the art from this disclosure.

SUMMARY OF THE INVENTION

One object of the present invention is to provide a flywheel assembly with a dynamic damper to reduce engine noise during accelerating the speed of the engine.

According to one aspect of the present invention, a flywheel assembly is adapted to be coupled to a crankshaft of the engine, and includes a flywheel, a flexible plate and a dynamic damper. The flexible plate connects the flywheel with the crankshaft so as to be able to oscillate in a bending direction. The dynamic damper includes a mass body and an elastic body, which connects the mass body with the flywheel so as to be able to oscillate in a bending direction. Since this flywheel assembly combines the flexible plate with the dynamic damper, in accelerating the speed it can reduce a noise more efficiently than a flywheel assembly which has only a flexible plate. Because the dynamic damper can reduce a vibration around the resonance frequency of the bending vibration which remains in the normal range.

Another object of the present invention is to provide a torque converter with a dynamic damper to reduce engine noise during acceleration of the engine.

According to another aspect of the present invention, a torque converter is adapted to be coupled to a crankshaft of the engine, and includes a torque converter main body, a flexible plate and a dynamic damper. The flexible plate connects the torque converter main body with a crankshaft so as to be able to oscillate in a bending direction. The dynamic damper includes a mass body and an elastic body which connects the mass body with the torque converter main body so as to be able to oscillate in a bending direction.

Since this torque converter combines the flexible plate with the dynamic damper, during acceleration of the engine, it can reduce noise more efficiently than a torque converter which has only a flexible plate. Because the dynamic damper can reduce vibrations around the resonance frequency, the bending vibration remains in the normal range.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
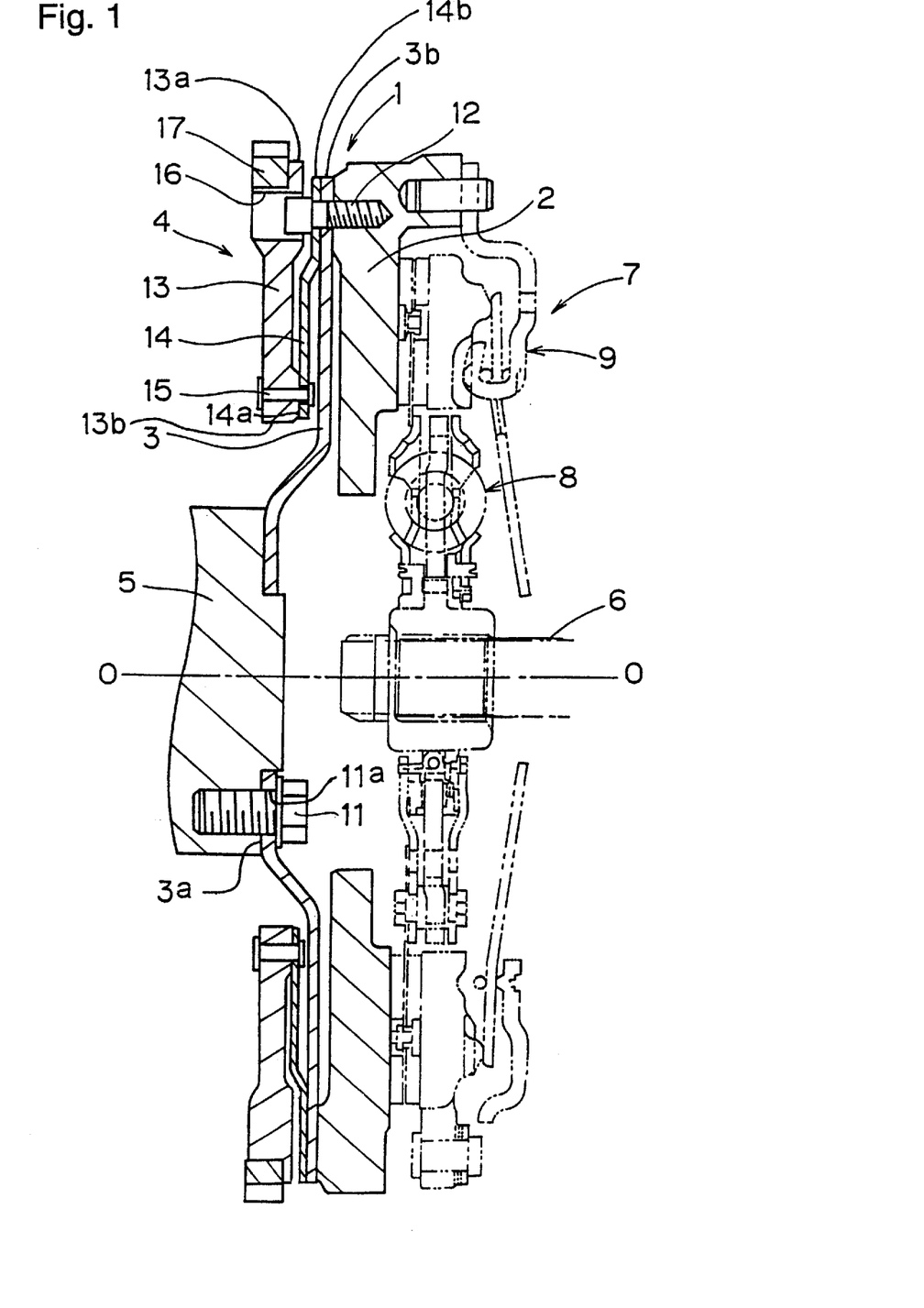
FIG. 1 shows a partial cross-sectional view of a flywheel assembly in accordance with a first embodiment of the present invention.

Referring initially to FIG. 1, a flywheel assembly 1 in accordance with a first embodiment is illustrated. The flywheel assembly 1 is installed in an engine of a car for transmitting a torque from the engine to other devices. More specifically, the flywheel assembly 1 is disposed between the engine (not shown) and a transmission (not shown), and transmits a torque from a crankshaft 5 of the engine to a main drive shaft 6 of the transmission. The engine and transmission are conventional, and thus, they will not be illustrated herein. As viewed in FIG. 1, the engine is located on the left side of the flywheel assembly 1, while the transmission is located on the right side of the flywheel.

The flywheel assembly 1 basically includes a flywheel 2, a flexible plate 3 coupling the crankshaft 5 of the engine to the flywheel 2 and a dynamic damper 4 coupled to the outer periphery of the flexible plate 3 and the flywheel 2.

The flywheel 2 is a thick disk-like portion and has a friction surface on the transmission side. A clutch device 7 is coupled to the flywheel 2 on the transmission side in a conventional manner. The clutch device 7 includes a clutch disk assembly 8 and a clutch cover assembly 9. The clutch disk assembly 8 is connected to the main drive shaft 6 extending from the transmission so as to be able to transmit a torque.

The flexible plate 3 is a thin disk-shaped plate, which has a high rigidity in the direction of rotation and a low rigidity in the direction of the bending vibrations, i.e., a generally axial bending or movement of the flexible plate 3 relative to the axis of rotation. In other words, the flexible plate 3 functions as a vibration cut-off portion in a bending direction. The inner circumference or periphery of the flexible plate 3 forms an attachment portion 3a that is fixedly coupled to the end of the crankshaft 5 by a plurality of crankbolts 11 via holes 11a. The outer circumference or periphery 3b of the flexible plate 3 is fixedly coupled to the outer circumferential side face of the flywheel 2 on the engine side by a plurality of bolts 12. In other words, the flywheel 2 is supported by the crankshaft 5 via the flexible plate 3. A torque of the crankshaft 5 is transmitted to the flywheel 2 via the flexible plate 3. The flexible plate 3 is constructed to absorb a bending vibration transmitted from the engine. The flexible plate 3 also reduces vibrations in the flywheel 2 by bending in a bending direction. Of course, the shape of the flexible plate 3 is not limited to a disk-shaped shape. For example, the flexible plate 3 can be cross-shaped, and may have a hole or cutout formed therein.

The dynamic damper 4 is a device which is designed to reduce vibrations in a bending direction of the flywheel 2 as well as in the flexible plate 3. Specifically, the dynamic damper 4 moves or bends in a generally axial direction relative to the axis of rotation to reduce vibrations in the flywheel 2. The dynamic damper 4 is fixedly coupled to the outer circumference of the flywheel 2 on its engine side. The dynamic damper 4 includes mainly a mass body 13 and a flexible plate or elastic body 14.

The mass body 13 is an annular, or more accurately, a relatively thick disk-shaped member, which is disposed close to the outer circumference of the flywheel 2 on the engine side. A ring gear 17 is fixed to the outer circumference or periphery 13a of the mass body 13.

The flexible plate 14 is an annular ring-shaped member, which is disposed between the mass body 13 and the outer circumference of the flexible plate 3. Preferably, the flexible plate 14 is constructed of a sheet metal material which can bend in an axial direction. The flexible plate 14 functions as an elastic body to connect the mass body 13 with the flywheel 2 so as to be able to oscillate in a bending direction. The inner circumference or peripheral portion 14a of the plate 14 is fixed to the inner circumference or periphery 13b of the mass body 13 by a plurality of rivets 15. The outer circumference or peripheral portion 14b of the plate 14 is fixed to the flywheel 2 by the above-mentioned bolt 12 together with the outer circumference of the flexible plate 3. Thus, the mass body 13 is supported by the flywheel 2 via the plate 14 so as to be able to oscillate in a bending direction. A hole 16 is formed at the location of the mass body 13 corresponding to the head of one of the bolts 12. The hole 16 functions as a hole which allows the bolt 12 to pass through when the dynamic damper 4 is being connected with the flywheel 2. In addition, the holes 16 avoid the interference from the heads of the bolts 12 when the mass body 13 oscillates in an axial direction against the flywheel 2.

Figure 4:
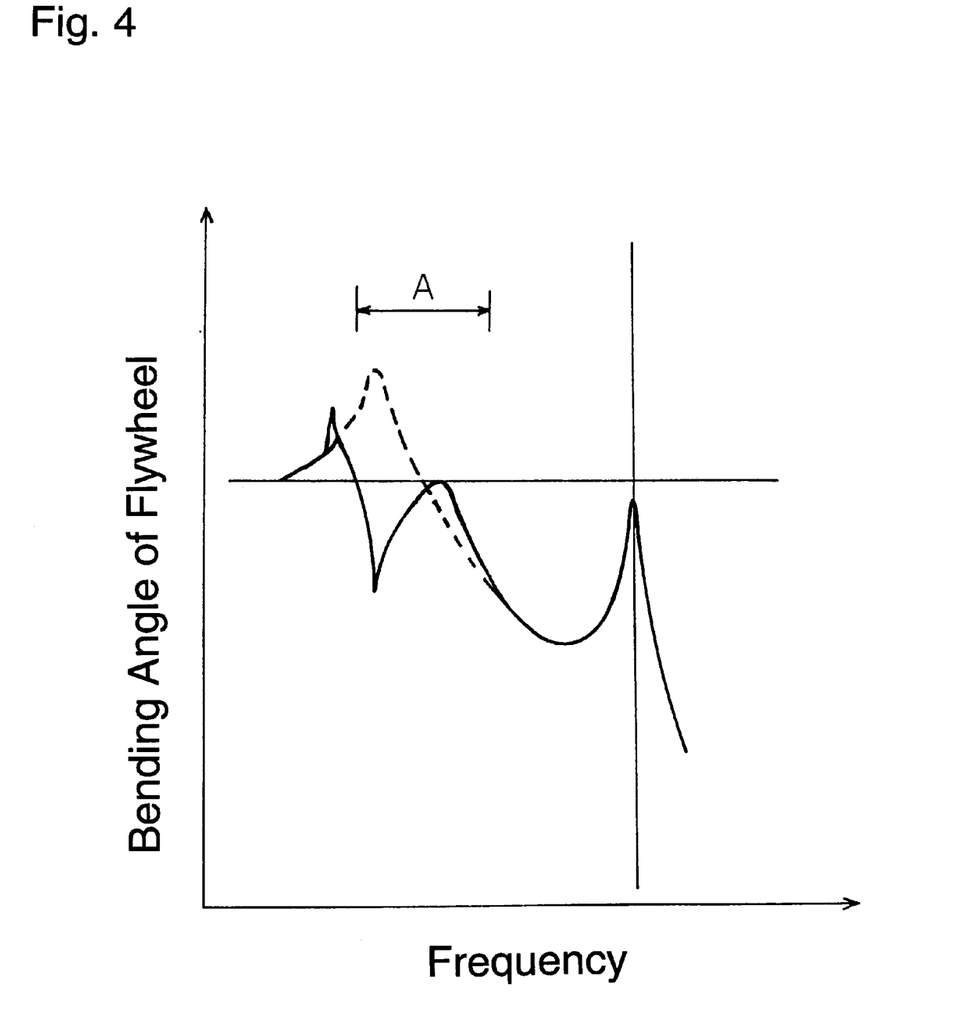
FIG. 4 is a graph illustrating vibrational characteristics of a flywheel or torque converter main body with a dynamic damper incorporated therein in accordance with the present invention.

FIG. 4 shows a vibration characteristic of the flywheel 2. A dotted line represents a characteristic (flexible plate alone) when the flywheel is fixed to the crankshaft via the flexible plate. A solid line is that in accordance with one embodiment (flexible plate plus dynamic damper) of the present invention.

Although a resonance frequency is divided into two in a dotted characteristic (flexible plate alone), the resonance frequency on a low frequency side remains in a normal region A.

The above-mentioned resonance frequency on a low frequency side is divided into two in a solid characteristic (flexible plate plus dynamic damper), the divided two resonance frequency is lower than the above-mentioned resonance frequency on a low frequency side. Especially, the newly divided resonance frequency on a low frequency side is out of the normal region A.

A characteristic frequency of the dynamic damper 4 (determined by the mass body 13 and the plate 14) is set so as to show the above-mentioned characteristic.

As described above, by combining the flexible plate 3 with the bending direction dynamic damper 4, the vibration around the resonance frequency of the bending vibration which remains in a normal region can be reduced. As the result, the noise of the engine in accelerating the speed is reduced.

The structure of the dynamic damper is not limited to that of the present embodiment. For the elastic portion included in the dynamic damper not a plate spring, but other types of springs or an elastic body such as rubber can be used.

A Second Embodiment

Figure 2:
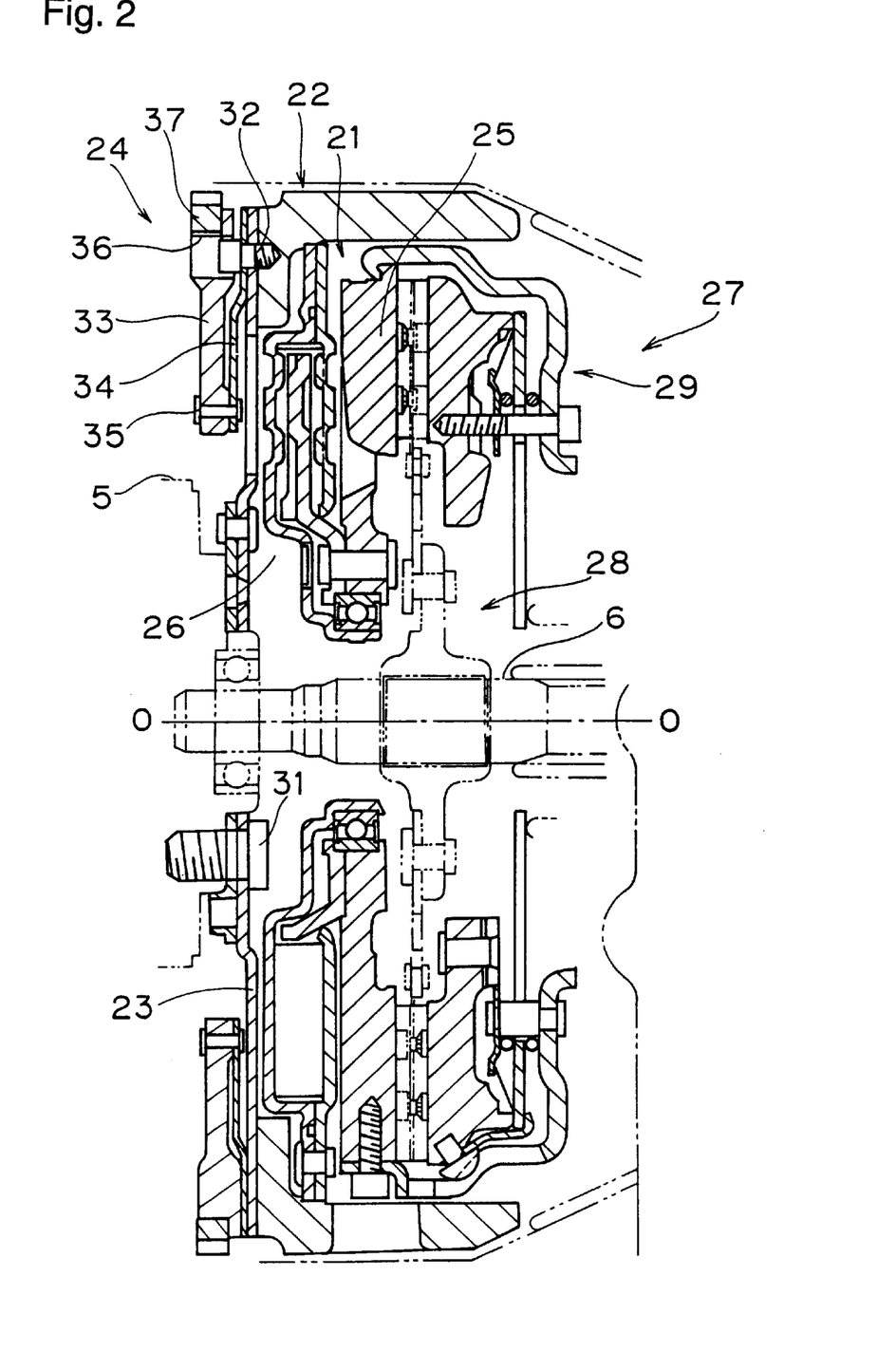
FIG. 2 shows a partial cross-sectional view of a flywheel assembly in accordance with a second embodiment of the present invention.

Referring now to FIG. 2, a flywheel assembly 21 is illustrated that incorporates the present invention. The flywheel assembly 21 is a device which is installed in an engine of a car for transmitting a torque from an engine to another device. More specifically, the flywheel assembly 21 is disposed between the engine (not shown) and a transmission (not shown), and transmits a torque from a crankshaft 5 of the engine to a main drive shaft 6 of the transmission. The engine and transmission (both not shown), are located on the left and right sides of the flywheel assembly illustrated in FIG. 2, respectively.

The flywheel assembly 21 basically includes a flywheel wheel 22, a flexible plate 23 and a dynamic damper 24 in a bending direction, a second flywheel 25 and a dampening mechanism 26.

The flywheel 22 is a cylinder-shaped member extending in an axial direction about axis O—O. The second flywheel 25 is disposed on the inner circumferential side of the flywheel 22. The second flywheel 25 is connected with the flywheel 22 via the dampening mechanism 26. The dampening mechanism 26 is a mechanism that not only connects both flywheels 22 and 25 together so as to be able to transmit a torque, but also absorbs and attenuates torsional vibrations between them. The second flywheel 25 has a friction surface on its transmission side. A clutch device 27 is coupled to the second flywheel 25 on its transmission side in a conventional manner. The clutch device 27 includes a clutch disk assembly 28 and a clutch cover assembly 29. The clutch disk assembly 28 is connected with the main drive shaft 6 extending from the transmission, so as to be able to transmit a torque thereto.

The flexible plate 23 includes a disk-shaped member constructed of a thin sheet metal. The flexible plate 23 has a high rigidity in the direction of rotation and a low rigidity in the direction of the bending vibrations. The inner circumference of the flexible plate 23 is fixedly coupled to the end of the crankshaft 5 by a plurality of crank bolts 31. The outer circumference of the flexible plate 23 is fixedly coupled to the outer circumferential side face of the flywheel 22 on the engine side by a plurality of bolts 32. In other words, the flywheel 22 is supported by the crankshaft 5 via the flexible plate 23. A torque of the crankshaft 5 is transmitted to the flywheel 22 via the flexible plate 23. The flexible plate 23 is constructed to absorb a bending vibration transmitted from the engine by bending in a bending direction. The flexible plate 23 also reduces a vibration of the flywheel 22. In other words, the flexible plate 23 functions as a vibration cut-off portion in a bending direction. The shape of the flexible plate 23 is not limited to a disk-shaped member. For example, the flexible plate 23 can be cross-shaped, and may have a hole or cutout.

The dynamic damper 24 is designed to reduce vibrations in a bending direction of the flywheel 22 as well as in the flexible plate 23. The dynamic damper 24 is coupled to in the outer circumference of the flywheel 2 on the engine side. The dynamic damper 24 includes mainly a mass body 33 and a flexible plate or elastic body 34.

The mass body 33 is an annular ring-shaped member. More specifically, the mass body 33 is a relatively thick disk-shaped member, which is disposed close to the outer circumference of the flywheel 22 on the engine side. A ring gear 37 is formed on the outer circumference of the mass body 33.

The flexible plate 34 is an annular sheet metal member, which is disposed between the mass body 33 and the outer circumference of the flexible plate 23. The plate 34 functions as an elastic body to connect the mass body 33 with the flywheel 22 so as to be able to oscillate in a bending direction. The inner circumference of the plate 34 is fixedly coupled to the inner circumference of the mass body 33 by a plurality of rivets 35. The outer circumference of the plate 34 is fixedly coupled to the flywheel 22 by the above-mentioned bolts 32 together with the outer circumference of the flexible plate 23. Thus, the mass body 33 is supported by the flywheel 22 via the plate 34 so as to be able to oscillate in a bending direction. Holes 36 are formed at circumferentially spaced locations of the mass body 33, which correspond to the locations of the heads of the bolts 32. The holes 36 function as holes which the bolts 32 pass through when the dynamic damper 24 is connected with the flywheel 22. In addition, the holes 36 avoid the interference from the heads of the bolts 32 when the mass body 33 oscillates in an axial direction against the flywheel 22. While three holes 36 are illustrated, it will be apparent to those skilled in the art that fewer or more holes can be provided as needed and or desired.

In this embodiment, the effect similar to that obtained in the first embodiment can be obtained. The structure of the dynamic damper is not limited to that of the present embodiment. For example, the elastic portion included in the dynamic damper is not necessarily a plate spring, but can be other types of springs or an elastic body such as rubber.

A Third Embodiment

Figure 3:
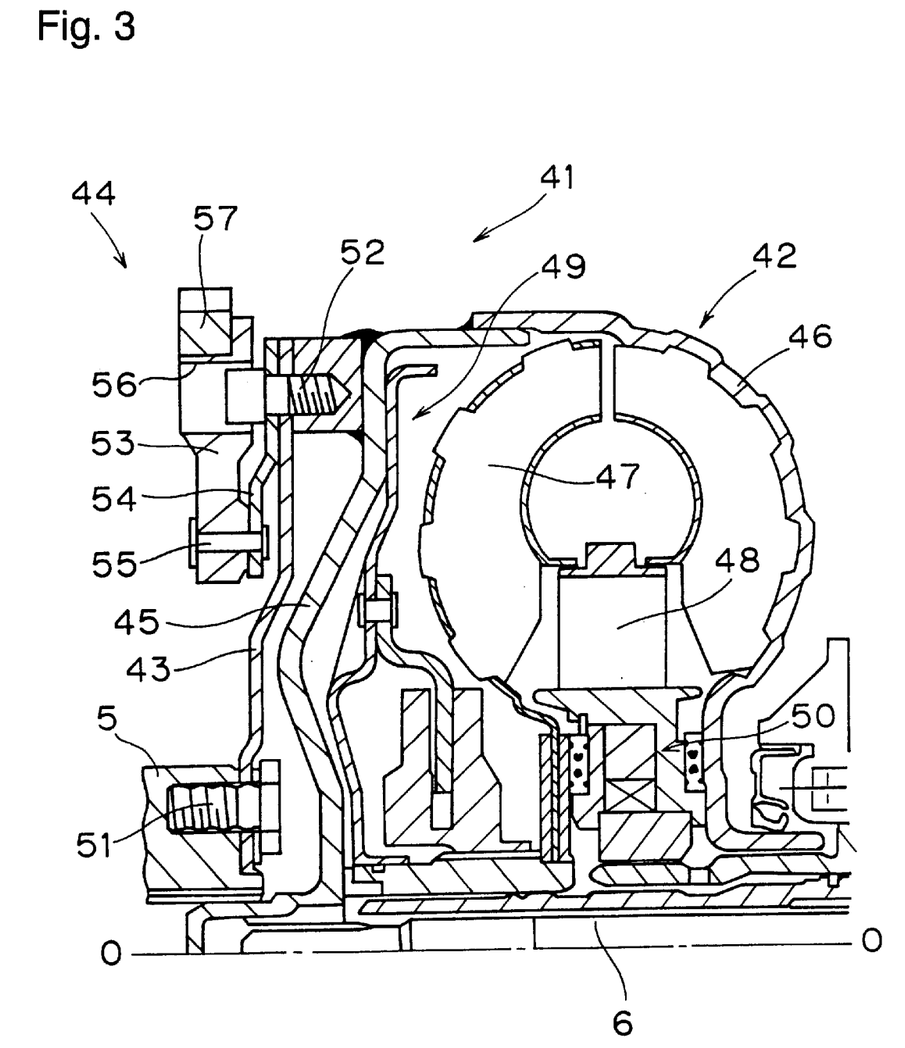
FIG. 3 shows a partial cross-sectional view of a torque converter in accordance with a third embodiment of the present invention.

Referring now to FIG. 3, a torque converter 41 is illustrated which incorporates the present invention. The torque converter 41 is installed in an engine of a car for transmitting a torque from an engine to another device. More specifically, the torque converter 41 is disposed between the engine (not shown) and a transmission (not shown), and transmits a torque from a crankshaft 5 of the engine to a main drive shaft 6 of the transmission. The engine and transmission (both not shown) are placed on the left and right sides of the torque converter 41 in FIG. 3, respectively.

The torque converter 41 basically includes a torque converter main body 42, a flexible plate 43 and a bending direction dynamic damper 44. The torque converter main body 42 includes a runner such as impeller 46, turbine 47, stator 48. The torque converter main body 42 is a device which transmits a torque via hydraulic fluid. A hydraulic fluid chamber of torque converter 41 includes a front cover 45 and an impeller 46. The turbine 47 is disposed at the location opposing the impeller 46. The turbine 47 is connected to the main drive shaft 6. The stator 48 is disposed between both inner circumferences of the impeller 46 and turbine 47, and is supported by a fixing shaft via one way clutch 50. A lock up clutch 49 is disposed between the front cover 45 and the turbine 47 in the hydraulic fluid chamber.

The flexible plate 43 is a disk-shaped member, which is preferably made of a thin iron sheet. The flexible plate 43 has a high rigidity in the direction of rotation and a low rigidity in the direction of the bending vibrations. The inner circumference of the flexible plate 43 is fixedly coupled to the end of the crankshaft 5 by a plurality of crank bolts 51. The outer circumference of the flexible plate 43 is fixedly coupled by a plurality of bolts 52 to an annular portion 70, which in turn is welded to the outer circumferential side face of the torque converter main body 42 on the engine side (outer circumference of the front cover 45). In other words, the torque converter main body 42 is supported by the crankshaft 5 via the flexible plate 43. A torque of the crankshaft 5 is transmitted to the torque converter main body 42 via the flexible plate 43. The flexible plate 43 absorbs a bending vibration transmitted from the engine by bending in a bending direction, and reduces a vibration of the torque converter main body 42. In other words, the flexible plate 43 functions as a vibration cutoff portion in a bending direction. The shape of the flexible plate 43 is not limited to a disk-shaped member. For example, the flexible plate 43 can be a cross-shaped, and may have a hole or cutout.

The dynamic damper 44 is a device to reduce a bending direction vibration of the torque converter main body 42 as well as the flexible plate 43. The dynamic damper 44 is installed in the outer circumference of the torque converter main body 42 on the engine side. The dynamic damper 44 includes mainly a mass body 53 and a flexible plate or elastic portion 54.

The mass body 53 is an annular ring-shaped member with a relatively thick cross-section. The mass body is disposed close to the outer circumference of the torque converter main body 42 on the engine side. A ring gear 57 is fixedly formed on the outer circumference of the mass body 53.

The flexible plate 54 is preferably an annular metal sheet member, which is disposed between the mass body 53 and the outer circumference of the flexible plate 43. The plate 54 functions as an elastic body to connect the mass body 53 with the torque converter main body 42 so as to be able to oscillate in a bending direction. The inner circumference of the plate 54 is fixedly coupled to the inner circumference of the mass body 53 by a plurality of rivets 55. The outer circumference of the plate 54 is fixedly coupled to the annular portion 70 of the torque converter main body 42 as well as the outer circumference of the flexible plate 43 by the above-mentioned bolts 52. Thus, the mass body 53 is supported by the torque converter main body 42 via the plate 54 so as to be able to oscillate in a bending direction. Holes 56 are formed at the location of the mass body 53 corresponding to the heads of the bolts 52. The holes 56 function as holes which allow the bolts 52 to pass through when the dynamic damper 44 is connected with the torque converter main body 42. The holes 56 avoid an interference from the heads of the bolts 52 when the mass body 53 oscillates in an axial direction against the torque converter main body 42.

In this embodiment, the effect similar to that obtained in the first embodiment can be obtained. The structure of the dynamic damper is not limited to that of the present embodiment. For example, the elastic portion included in the dynamic damper is not necessarily a plate spring, but can be other types of springs or an elastic body such as rubber.

Accordingly, a flywheel assembly or torque converter relating to the present invention has a combination of a flexible plate and a dynamic damper in which the noise in accelerating the speed can be reduced in comparison with flywheel assemblies and torque converters having only a flexible plate. Because vibrations around a resonance frequency of a bending vibration remains in a normal region, the noise during acceleration of the speed of the engine can be reduced by a dynamic damper.

While several embodiments have been chosen to illustrate the present invention, it will be apparent to those skilled in the art from this disclosure that various changes and modifications can be made herein without departing from the scope of the invention as defined in the appended claims.

What is claimed is:

1. A flywheel assembly adapted to be coupled to a crankshaft, said flywheel assembly comprising:
    a flywheel;
    a flexible plate with a first rigidity in a rotational direction and a second rigidity in an axial direction that is lower than said first rigidity, said plate being attached between said flywheel and adapted to be attached to the crankshaft; and
    a dynamic damper including a mass body and an elastic body, with said elastic body being attached between said mass body and said flywheel to oscillate in an axial direction relative to said flywheel.

2. The flywheel assembly according to claim 1, wherein said flexible plate is coupled at its outer periphery to said flywheel, and has an attachment portion at its inner periphery to the crankshaft.

3. The flywheel assembly according to claim 2, wherein said flexible plate is disk-shaped with bolts coupling said outer periphery to said flywheel and holes formed at said inner periphery for receiving fasteners therethrough.

4. The flywheel assembly according to claim 2, wherein said mass body is coupled at one end to said elastic body and has a free end.

5. The flywheel assembly according to claim 4, wherein said elastic body is coupled at a first end to said flywheel and has a second end coupled to said mass body with said second end of said elastic body being axially spaced from said plate.

6. The flywheel assembly according to claim 1, wherein an outer peripheral portion of said flexible plate and an outer peripheral portion of said elastic body are coupled together.

7. The flywheel assembly according to claim 6, wherein said mass body is coupled at its inner periphery to an inner peripheral portion of said elastic body.

8. A flywheel assembly adapted to be coupled to a crankshaft, said flywheel assembly comprising:
    a flywheel;
    a flexible plate with a first rigidity in a rotational direction and a second rigidity in an axial direction that is lower than said first rigidity, said plate being coupled to said flywheel and adapted to be coupled to the crankshaft; and
    a dynamic damper including a mass body and an elastic body, with said elastic body coupling said mass body to said flywheel to oscillate in an axial direction relative to said flywheel; and
    an outer peripheral portion of said flexible plate and an outer peripheral portion of said elastic body being coupled together;
    said flexible plate being coupled at its outer periphery to said flywheel, and having an attachment portion at its inner periphery to the crankshaft,
    said mass body has a ring gear coupled to its outer periphery.

9. A flywheel assembly adapted to be coupled to a crankshaft, said flywheel assembly comprising:
    a flywheel;
    a flexible plate with a first rigidity in a rotational direction and a second rigidity in an axial direction that is lower than said first rigidity, said plate being coupled to said flywheel and adapted to be coupled to the crankshaft;
    a dynamic damper including a mass body and an elastic body, with said elastic body coupling said mass body to said flywheel to oscillate in an axial direction relative to said flywheel; and
    an outer peripheral portion of said flexible plate and an outer peripheral portion of said elastic body being coupled together,
    said flexible plate being coupled at its outer periphery to said flywheel, and having an attachment portion at its inner periphery to the crankshaft,
    said elastic body being coupled at its outer periphery to said outer periphery of said flywheel.

10. The flywheel assembly according to claim 9, wherein said mass body is coupled at its inner periphery to an inner peripheral portion of said elastic body.

11. The flywheel assembly according to claim 10, wherein said flexible plate is coupled at its outer periphery to said flywheel, and has an attachment portion at its inner periphery to the crankshaft.

12. A flywheel assembly adapted to be coupled to a crankshaft, said flywheel assembly comprising:
    a flywheel;

a flexible plate with first rigidity in a rotational direction and a second rigidity in an axial direction that is lower than said first rigidity, said plate being coupled to said flywheel and adapted to be coupled to the crankshaft;

a dynamic damper including a mass body and an elastic body, with said elastic body coupling said mass body to said flywheel to oscillate in an axial direction relative to said flywheel; and an outer peripheral portion of said flexible plate and an outer peripheral portion of said elastic body being coupled together, said mass body being coupled at its inner periphery to an inner peripheral portion of said elastic body, said outer peripheral portions of said flexible plate and said elastic body being coupled to said flywheel by bolts.

13. The flywheel assembly according to claim 12, wherein said mass body is provided with openings which are aligned with said bolts.

* * * * *